United States Patent [19]

Satchell, Jr.

[11] 4,165,264

[45] Aug. 21, 1979

[54] AMMONIA LEACHING

[75] Inventor: Donald P. Satchell, Jr., Clifton, Ariz.

[73] Assignee: Phelps Dodge Corporation, New York, N.Y.

[21] Appl. No.: 915,176

[22] Filed: Jun. 14, 1978

[51] Int. Cl.² .................................. C25C 1/12
[52] U.S. Cl. ........................ 204/106; 423/32; 423/356; 423/357; 75/103; 75/117; 204/108
[58] Field of Search .............. 423/32, 33, 357, 356, 423/438; 204/106, 108; 75/103, 117

[56] References Cited

U.S. PATENT DOCUMENTS

| 755,302 | 3/1904 | Le Sueur | 75/117 |
|---|---|---|---|
| 1,131,986 | 3/1915 | Benedict | 423/32 |
| 1,232,080 | 7/1917 | Pope et al. | 204/108 |
| 1,509,774 | 9/1924 | Perkins | 423/33 |
| 1,570,858 | 1/1926 | Perkins | 423/33 |
| 1,598,296 | 8/1926 | MacKay | 204/108 |
| 1,838,587 | 12/1931 | Sperr | 423/357 |
| 2,727,818 | 12/1955 | Kenny et al. | 423/33 |
| 2,727,819 | 12/1955 | Kenny et al. | 423/33 |
| 2,822,263 | 2/1958 | Forward | 423/32 |
| 3,347,662 | 10/1967 | Snyder | 75/106 |
| 3,751,554 | 8/1973 | Bare et al. | 423/32 |
| 3,775,097 | 11/1973 | Cech | 75/103 |

*Primary Examiner*—Brian E. Hearn
*Attorney, Agent, or Firm*—Ronald A. Schapira

[57] ABSTRACT

An improved process for obtaining copper from a copper sulfide, in which: the copper sulfide is treated with oxygen and an aqueous leaching solution of ammonium carbonate, to form a leach liquor which contains ammonia complexes of copper sulfate and copper carbonate; the leach liquor is heated to form gaseous ammonia and carbon dioxide; the leach liquor is treated with a strongly alkaline material to precipitate sulfates and form additional gaseous ammonia; and the copper is then recovered by electrowinning. In this process, the ammonium carbonate leaching solution is formed from carbon dioxide that is generated by: adding a metal carbonate to the leach liquor during the heating thereof; and recovering the gaseous carbon dioxide, as well as the gaseous ammonia, formed during the heating of the leach liquor.

7 Claims, 1 Drawing Figure

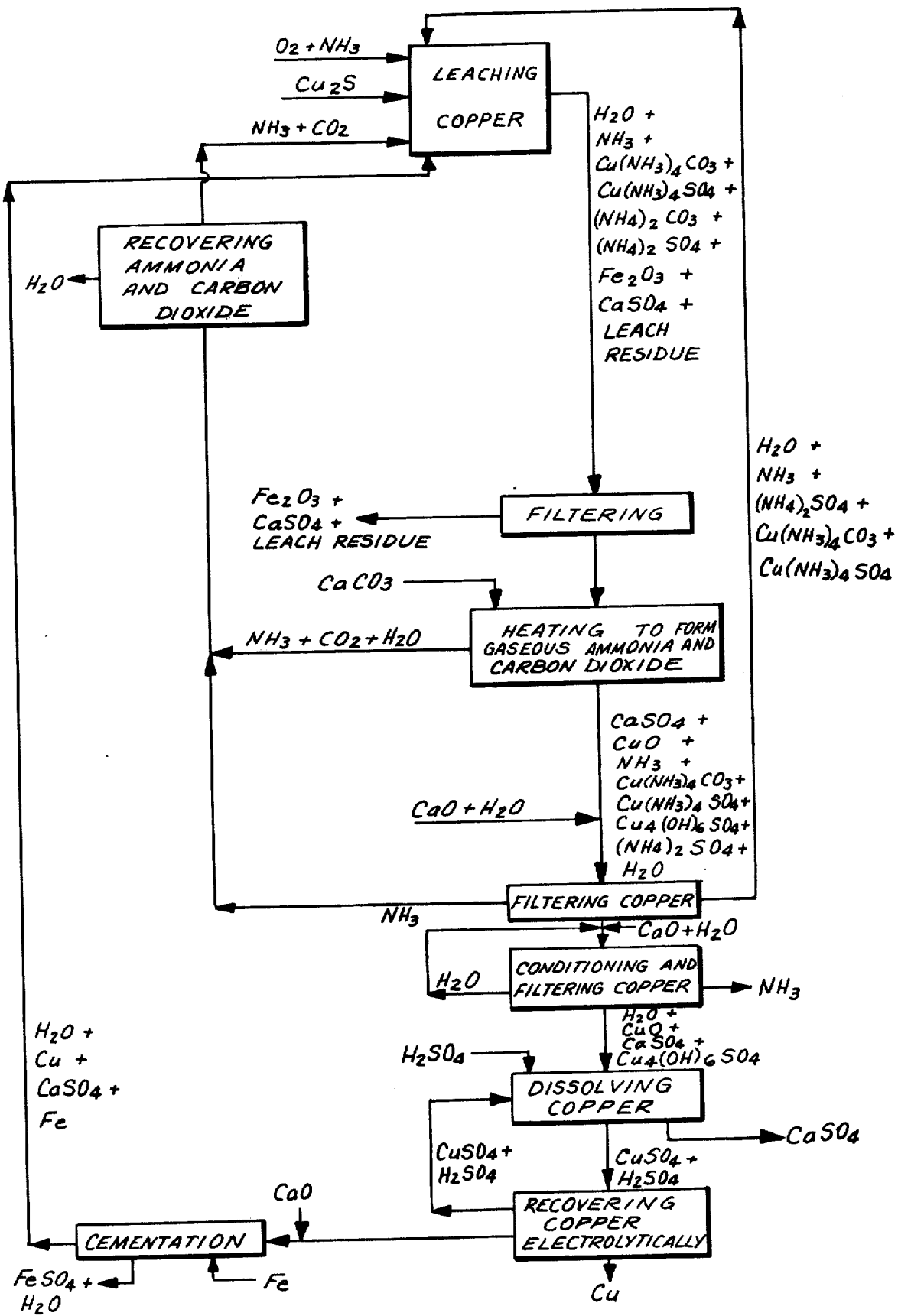

AMMONIA LEACHING

BACKGROUND OF THE INVENTION

This application relates to an improved process for leaching copper from a copper sulfide with an aqueous ammonium carbonate solution. This application particularly relates to a method of generating ammonium carbonate, for use in the leaching process, by recovering ammonia and carbon dioxide from the leach liquor formed during the process. This application quite particularly relates to a method for providing additional amounts of carbon dioxide during the recovery of ammonia and carbon dioxide from the leach liquor, in order to make up for losses of carbon dioxide, which are incurred during the treatment of the leach liquor formed during the process.

Processes for leaching copper from a copper sulfide at elevated temperatures which an oxygen-containing gas and an aqueous solution, containing ammonium carbonate as well as ammonia, have been well known. See, for example, U.S. Pat. No. 1,570,858 of Perkins and U.S. Pat. No. 2,727,818 and 2,727,819 of Kenny et al. Generally, in such leaching processes, the leach liquor formed has been heated to distill off gaseous ammonia and carbon dioxide and precipitate copper values from the leach liquor. Frequently, the leach liquor has then been treated in such processes with a strongly alkaline material such as lime. The strongly alkaline material has served to precipitate most of the sulfates, as gypsum, from the leach liquor. This has made it possible to recycle the leach liquor to the copper leaching step of the process and recover the unprecipitated copper values in the leach liquor without undue interference from sulfur compounds in the recycled leach liquor. The strongly alkaline material also has liberated, as a gas, ammonia which has been complexed with the copper in the leach liquor, bound to the precipitated copper values, or dissolved in the leach liquor as ammonium sulfate. In this regard, the use of the strongly alkaline material typically has served to reduce the ammonia content of the precipitated copper values to a practical minimum, so that the ammonia does not unduly interfere with the subsequent electrowinning of the copper. Copper has then been recovered by separating the precipitated copper values from the leach liquor, dissolving the copper values in a strong mineral acid, and electrolytically isolating the copper in relatively pure form.

Frequently in such leaching processes, the gaseous ammonia and carbon dioxide, distilled off during the heating of the leach liquor, have been recovered and utilized to generate ammonium carbonate for use in the leaching of copper. However, before the leach liquor has been heated to distill off ammonia and carbon dioxide, substantial losses of carbon dioxide have inevitably occurred in the course of treating the leach liquor. Such losses of carbon dioxide have mainly taken place in process vessels, containing the leach liquor, that are open to atmosphere, such as apparatuses for separating liquids and solids, holding vessels, and surge tanks. The result of such losses has been that the amounts of carbon dioxide, recovered during the heating of the leach liquor, have generally not been sufficient to generate enough ammonium carbonate to satisfy the needs of the leaching processes. Hence, it has been considered necessary, in carrying out a commercial leaching process with ammonium carbonate, to utilize an external source of carbon dioxide.

Unfortunately, the costs involved in using external sources of carbon dioxide for generating needed amounts of ammonium carbonate have generally been significant. Alternative, less expensive ways have been sought therefore for providing the amounts of carbon dioxide, needed to make up for carbon dioxide losses which inevitably occur when carrying out a leaching process with ammonium carbonate.

SUMMARY OF THE INVENTION

In accordance with the invention in this application, a process is provided wherein copper is obtained from a copper sulfide by the steps of: (1) treating the copper sulfide with oxygen and an aqueous leaching solution of ammonium carbonate, to form a leach liquor containing ammonia complexes of copper sulfate and copper carbonate; (2) heating the leach liquor to form gaseous ammonia and carbon dioxide; (3) treating the leach liquor with a strongly alkaline material to precipitate sulfates and form additional gaseous ammonia; and (4) then recovering copper by electrowinning; and wherein the improvement comprises the steps of:

adding a metal carbonate to the leach liquor during the step (2) of heating the leach liquor; and recovering the gaseous carbon dioxide and ammonia, formed during the step (2) of heating the leach liquor. By this process improvement, sufficient amounts of carbon dioxide can be expeditiously provided to generate needed amounts of ammonium carbonate for carrying out the copper leaching process. Also by this process improvement, such amounts of carbon dioxide can be obtained utilizing only relatively inexpensive, raw materials and process equipment.

BRIEF DESCRIPTION OF THE DRAWING

Shown in the FIGURE is a schematic flow diagram of a process involving the steps of: (1) leaching copper with aqueous ammonia and ammonium carbonate; (2) heating the resulting leach liquor to form gaseous ammonia and carbon dioxide; (3) treating the leach liquor with a strongly alkaline material to precipitate sulfates and form additional gaseous ammonia; (4) then recovering copper by electrowinning; and (5) recovering the gaseous ammonia and carbon dioxide from the heating step (2) and recycling these gases to the leaching step (1).

DETAILED DESCRIPTION OF THE INVENTION

As used throughout this application, the term "copper" preferably means the element copper (Cu). However, equivalents of copper, such as nickel and cobalt, also are included within the term "copper" in this application.

In the process of this application, any copper sulfide, from which copper values can be leached utilizing an aqueous leaching solution containing ammonium carbonate, can be used as the starting material. In this regard, among the copper sulfides which can be used are covalite (CuS), chalcocite ($Cu_2S$) and chalcopyrite ($CuFeS_2$). Preferably, the copper sulfide starting material is chalcocite or a copper sulfide concentrate, in which the molar ratio of copper to soluble sulfur values is about 1.5 or more. It is also preferred that the copper sulfide starting material also contain cement copper, recovered from the electrowinning step of the process.

In the first step of the process of this application, the leaching of copper from a copper sulfide can be carried out with conventional equipment and in a conventional manner using an oxygen-containing gas and an aqueous leaching solution of ammonium carbonate. In this leaching step, any oxygen-containing gas can be utilized, such as air, preferably oxygen. Also, any conventional aqueous ammonium carbonate leaching solution can be utilized. Preferably, the leaching step is carried out with an ammonium carbonate solution containing a molar excess of ammonium carbonate relative to copper, e.g., 20–50%, preferably about 30%, molar excess of ammonium carbonate, and containing free ammonia, e.g., 10–50 grams of ammonia per liter of leaching solution, preferably about 25 grams of ammonia per liter of leaching solution. The leaching step also is preferably carried out with a copper content of at least about 80 grams of copper per liter of leaching solution, preferably about 130 grams of copper per liter of leaching solution.

In the leaching step, temperature and pressure are not critical, and conventional temperatures and pressures can be suitably utilized. In this regard, temperatures of 140° to 200° F., preferably about 170° F., and pressures of 15 to 100 p.s.i.g., preferably about 50 p.s.i.g., can be suitably utilized.

By this step of leaching copper values with aqueous ammonium carbonate at elevated temperatures in the presence of an oxygen-containing gas, an aqueous leach liquor is obtained containing ammonia complexes of copper carbonate, principally $Cu(NH_3)_4CO_3$, and ammonia complexes of copper sulfate, principally $Cu(NH_3)_4SO_4$. Also by this step, any iron or iron sulfides which are leached, such as the iron in chalcopyrite, as well as any pure iron which is present, are converted to insoluble iron oxides, such as ferric oxide ($Fe_2O_3$).

Following the leaching step, the aqueous slurry produced is preferably filtered to separate the leach liquor from any insoluble materials, such as iron oxides, calcium sulfate and any leach residue. This filtration step can be carried out in a conventional manner.

The leach liquor is then heated in a conventional manner to form gaseous ammonia and carbon dioxide, and the ammonia and carbon dioxide gases, evolved during this step, are recovered. In carrying out this step, it is preferred that the leach liquor be heated to an elevated temperature of about 200° F. or higher, so that the leach liquor boils. It is also preferred that this heating step be carried out, so that a significant percentage, e.g., 30 to 85%, preferably about 75%, of the water in the leach liquor is boiled off with the ammonia and carbon dioxide. It is further preferred that this heating step be carried out in a closed vessel and that a somewhat elevated pressure, e.g., 10 to 100 p.s.i.g., preferably about 50 p.s.i.g., be provided in the vessel. As a result of this heating step, a significant proportion, e.g., 40 to 95%, preferably about 90–95%, of the copper values precipitate from the leach liquor, principally as CuO and $Cu_4(OH)_6SO_4$.

In accordance with the invention in this application, the step of heating the leach liquor, to form ammonia and carbon dioxide gases and precipitate copper values, is carried out in an improved manner by adding a metal carbonate to the leach liquor during the heating step. The provision of the metal carbonate in the leach liquor during the heating step causes additional amounts of carbon dioxide to be evolved. Such additional amounts of carbon dioxide are recovered and combined with the recovered ammonia to generate sufficient ammonium carbonate to satisfy the requirements of the leaching step of the process. This result can be expeditiously achieved without the need for special carbon dioxide generating equipment or expensive raw materials.

In carrying out this improved heating step, the particular metal carbonate added is not critical, and any relatively water-soluble carbonate can be used, such as the alkali metal carbonates and alkaline earth metal carbonates. Preferably, a water-soluble carbonate, such as calcium carbonate or calcium bicarbonate, especially calcium carbonate, is employed, which contains a metal moiety that can form a water-insoluble sulfate salt.

Also in this improved heating step, the amount of metal carbonate added is not critical. Preferably, the amount of carbonate used in this step is sufficient to only make up only for carbon dioxide losses in the process system, as a whole, and to provide enough carbon dioxide to generate needed amounts of ammonium carbonate for the copper leaching step. Hence, the amount of carbonate added when heating the leach liquor preferably is based on the losses of carbon dioxide encountered in the overall system and comprises only the minimum amount needed to satisfy the ammonium carbonate requirements of the process system. In practice, it has been found that the moles of carbonate added in this heating step preferably comprise about 5% to about 50%, especially about 10% to 20%, of the total moles of base, used to precipitate sulfates from the leach liquor during the subsequent treatment of the leach liquor with a strongly alkaline material.

Further in this improved heating step, the metal carbonate is preferably added to the leach liquor as an aqueous slurry. It is also preferred that the leach liquor and carbonate slurry be mixed before introducing the leach liquor into the vessel, in which the leach liquor is heated to form gaseous ammonia and carbon dioxide. However, the manner of adding the metal carbonate to the leach liquor is not critical, and in this regard, conventional equipment for adding basic aqueous solutions or slurries to an aqueous solution can be used.

Still further in this improved heating step, the manner of recovering the gaseous ammonia and carbon dioxide, distilled off the heated leach liquor containing the metal carbonate, is not critical, and conventional means can be used for this recovery. Preferably, the ammonia and carbon dioxide gases are trapped and separated from the water vapor, which is also boiled off the leach liquor, and then the ammonia and carbon dioxide are recycled to the leaching step of the process. In this regard, it is preferred that the gaseous ammonia, carbon dioxide and water, evolved from the leach liquor, be piped to a conventional apparatus, in which the gaseous ammonia and carbon dioxide are separated from the water vapor by cooling the gases and fractionally distilling off the individual gases. The recovered ammonia and carbon dioxide, along with any make-up ammonia, can then be piped directly to the copper leaching step for use in treating further batches of copper sulfides.

Adding the metal carbonate in the heating step of the process of this application provides some additional benefits, besides furnishing enough carbon dioxide to make up for carbon dioxide losses in the process. In particular, the provision of the metal carbonate causes additional amounts of ammonia to be evolved as a gas during the heating of the leach liquor. This is because the carbonate reacts with the ammonium sulfate and with the ammonia complexes of copper in the leach liquor to liberate ammonia. Thereby, the use of the metal carbonate in this heating step makes it possible to recover additional amount of ammonia for generating the ammonium carbonate needed by the leaching step of the process. Thus, savings in the costs of ammonia for the process can be realized. Furthermore, adding a carbonate such as calcium carbonate in this heating step causes significant amounts of sulfates, such as gypsum ($CaSO_4$), along with relatively small amounts of copper values, to precipitate from the leach liquor. Thereby, the use of the metal carbonate in this step permits smaller amounts of the strongly alkaline material to be used in the next step of the process, wherein most of the sulfates are precipitated from the leach liquor and, in addition, ammonia is liberated as a gas from the leach liquor. Thus, savings in the costs of the relatively expensive, strongly alkaline material can be attained by the use of the metal carbonate in the heating step of this leaching process.

After heating the leach liquor containing the added metal carbonate in accordance with this invention, to form gaseous ammonia and carbon dioxide for recovery, the resulting leach liquor slurry, containing precipitated copper values, is treated in a conventional manner with a strongly alkaline material. The use of the strongly alkaline material in this step serves to precipitate sulfates from the leach liquor, as well as to form additional gaseous ammonia. The strongly alkaline material, utilized in this step, can be any conventional water-soluble base which contains a metal moiety that can form a water-insoluble sulfate salt and which will react with the residual amounts of ammonia, complexed with the copper in the leach liquor, bound to any precipitated copper values, and dissolved in the leach liquor as ammonium sulfate, to liberate ammonia as a gas. Preferably, the strongly alkaline material is a calcium salt such as lime (CaO).

This step of treating the leach liquor with a strongly alkaline material can be carried out in a conventional manner simply by adding an aqueous slurry of the strongly alkaline material to the slurry of leach liquor and precipatated copper values. In this regard, conventional equipment for treating an aqueous slurry with a basic aqueous slurry can be suitably utilized. Also in this step, the gaseous ammonia formed can, if desired, be recovered in a conventional manner as described above.

Adding the strongly alkaline material to the slurry of leach liquor and precipitated copper values causes most of the remaining sulfates to precipitate from the leach liquor. The sulfates precipitate in this step because sulfate ions in the leach liquor react with the metal moiety of the strongly alkaline material to form insoluble sulfate salts such as gypsum. Also as a result of this step, some ammonia is evolved as a gas from the leach liquor and the precipitated copper values. In this step, relatively small amounts of copper values also precipitate from the leach liquor as CuO and $Cu_4(OH)_6SO_4$.

The precipitated copper values, along with other precipitated materials such as metal sulfates, are then separated from the remaining leach liquor. The separated leach liquor preferably contains only a minimum amount of sulfates, e.g., 10 to 25%, preferably about 10 to 15%, of the sulfates originally in the leach liquor, and only a minimum amount of dissolved copper values, e.g., 3 to 25%, preferably about 5 to 10%, of the copper values in the original leach liquor. The separated leach liquor is preferably recycled back to the copper leaching step. The precipitated copper values, along with the other precipitated materials, then are preferably conditioned with a strongly alkaline material such as lime, to remove any remaining ammonia which may still be tied up with the precipitated copper values or other precipitated materials. In this conditioning step, the amounts of gaseous ammonia that are generated are generally too small to justify their recovery. After conditioning the precipitated copper values, they are separated from the strongly alkaline material.

The separation of the leach liquor from the precipitated copper values, the conditioning of the precipitated copper values with a strongly alkaline material, and the subsequent separation of the precipitated copper values from the strongly alkaline material can be carried out in a conventional manner. In this regard, conventional equipment can be suitably utilized, including conventional filtration equipment and conventional equipment, such as stirred tanks, for treating solids with basic aqueous solutions for extended periods such as 1 to 10 hours.

After conditioning the precipitated copper values, which are principally CuO and $Cu_4(OH)_6SO_4$, with the strongly alkaline material, the precipitated copper values are recovered by electrowinning. In carrying out this step, the copper values are initially separated from the other precipitated materials, such as gypsum, by dissolving the copper values in a strong mineral acid such as sulfuric acid. In carrying out this step, conventional process equipment and conditions can be utilized. In this step, the metal sulfates like gypsum, which do not dissolve in the mineral acid, can be easily removed from the acid liquor containing the dissolved copper. The copper is then recovered electrolytically from the acid. This electrolytic recovery of copper also can be carried out in a conventional manner. In this regard, because essentially all of the ammonia is separated from the copper before electrolysis of the acid liquor containing the copper is carried out, copper can be isolated without danger that ammonia will attack the anodes, such as lead anodes, used in the electrolysis and thereby interfere with the isolation of the copper.

In the electrowinning of the copper, the acid electrolyte is preferably reused. However, so that zinc and iron values, as well as ammonia, do not build up in the acid, a portion of the acid is preferably bled off and replaced by fresh acid, and residual copper values are recovered from the bled-off acid. The recovery of residual copper values from the bled-off acid electrolyte can be accomplished in a conventional manner. In this regard, it is preferred that the bled-off portion of the electrolyte be treated with a strongly alkaline material, such as lime, and that the electrolyte then be treated with iron, in a conventional manner, to cement copper values. The cemented copper values from such a step can then be recovered and recycled to the copper leaching step, while the water soluble, ammonia, zinc and iron values in the acid are removed from the process with the cementation liquor.

By this overall process, copper can be efficiently obtained from copper sulfide concentrates in a relatively simple and expedient fashion. In this process, the loss of product and reagent materials is kept to a minimum and, wherever possible, materials are recovered or recycled. As a result, copper extractions of as high as 98% can be obtained. Moreover, only minimum amounts of ammonia have to be added to the process in order to have sufficient ammonium carbonate for the leaching of copper, and carbon dioxide losses are made up in a relatively simple and cheap manner using inexpensive carbonates, such as limestone.

It is thought that the invention and many of its attendant advantages will be understood from the foregoing description, and it will be apparent that various changes may be made in the steps of the process of this invention without departing from the spirit and scope of the invention or sacrificing all of its material advantages, the form hereinbefore described being merely a preferred embodiment thereof.

I claim:

1. In a process for obtaining copper from a copper sulfide by the steps of: (1) treating the copper sulfide with oxygen and an aqueous leaching solution of ammonium carbonate, to form a leach liquor containing ammonia complexes of copper sulfate and copper carbonate; (2) heating the leach liquor to form gaseous ammonia and carbon dioxide; (3) treating the leach liquor with a strongly alkaline material to precipitate sulfates and form additional gaseous ammonia; and (4) then recovering copper by electrowinning; the improvement comprising the steps of:

adding a metal carbonate to the leach liquor during the step (2) of heating the leach liquor; and recovering the gaseous carbon dioxide and ammonia, formed during the step (2) of heating the leach liquor;

the amount of the metal carbonate added to the leach liquor in step (2) being about 5% to about 50% of the total moles of base used to precipitate sulfates from the leach liquor during the subsequent treatment of the leach liquor in step (3) with the strongly alkaline material.

2. The process of claim 1 wherein the metal carbonate is a water-soluble carbonate which contains a metal moiety that can form a water-insoluble sulfate.

3. The process of claim 2 wherein the metal carbonate is calcium carbonate or calcium bicarbonate.

4. The process of claim 3 wherein the metal carbonate is calcium carbonate.

5. The process of claim 1 wherein the step (2) of heating the leach liquor is carried out at a temperature of about 200° F. or higher, so that the leach liquor boils.

6. The proces of claim 5 wherein the step (2) of heating the leach liquor is carried out at an elevated pressure.

7. The process of claim 1 wherein the amount of metal carbonate added to the leach liquor in step (2) is about 10% to 20% of the total moles of base used to precipitate sulfates from the leach liquor in step (3) with the strongly alkaline material.

* * * * *